Patented Dec. 17, 1929

1,739,579

UNITED STATES PATENT OFFICE

PHILIP H. DOWLING, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Application filed June 20, 1928. Serial No. 286,984.

My invention relates to electrical translating apparatus of the amplifier type.

One object of my invention is the provision of amplifying apparatus having no electron tubes and no moving parts.

I will describe two forms of electrical translating apparatus embodying my invention, and will then point out the novel features thereof in claims.

Figure 1:
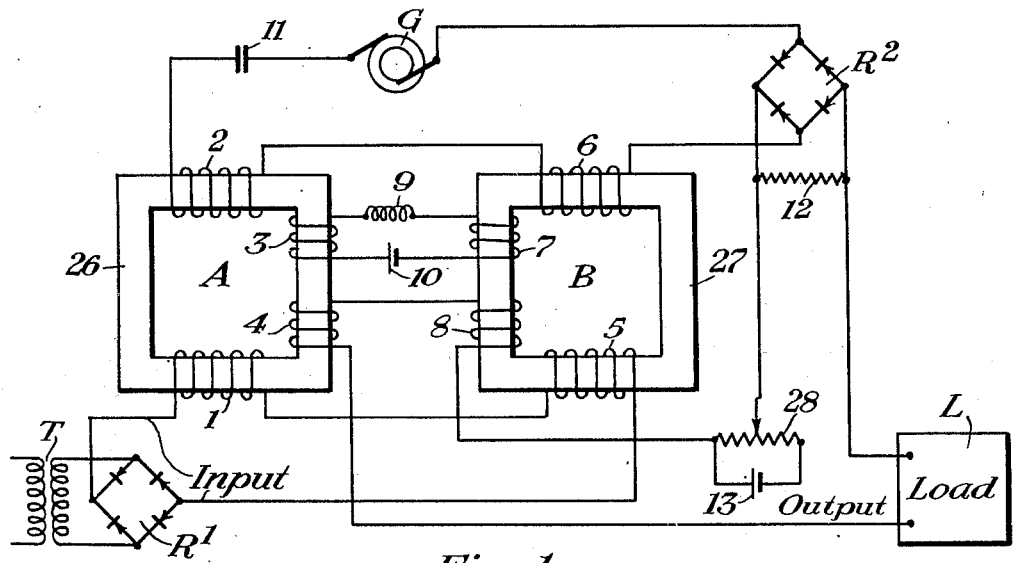

In the accompanying drawing, Fig. 1 is a diagrammatic view illustrating one form of translating apparatus embodying my invention. Figs. 2, 3, 4 and 5 are views showing modified forms of the apparatus shown in Fig. 1 and also embodying my invention.

Similar reference characters refer to similar parts in each of the several views.

Referring first to Fig. 1, the apparatus comprises two similar transformers A and B. Transformer A comprises a magnetizable core 26 provided with four windings 1, 2, 3 and 4 and transformer B comprises a magnetizable core 27 carrying four windings 5, 6, 7 and 8. Winding 1 of transformer A and winding 5 of transformer B are connected in series in an input circuit which also includes a source of direct current here shown as the secondary of a transformer T and a full wave rectifier $R^1$. Alternating current is at times supplied to the primary of transformer T and it will be seen that when current is supplied to this primary unidirectional current will be supplied to windings 1 and 5.

Winding 2 of transformer A and winding 6 of transformer B are supplied in series with alternating current from any suitable source such as an alternator G. The alternating current thus supplied to windings 2 and 6 is also supplied through a rectifier $R^2$ to an impedance 12. It follows therefore that the alternator G supplies alternating current to windings 2 and 6 and unidirectional current to an impedance 12 in series. The circuit including windings 2 and 6 may be tuned by condenser 11. The apparatus also comprises an output circuit which includes winding 4 of transformer A and winding 8 of transformer B in series with the impedance 12 and any suitable load L. The output circuit also includes a portion of an impedance 28, the terminals of which are connected with a battery 13. Transformers A and B are similar in proportion and windings 4 and 8 are connected in series in the output circuit in such manner that the alternating electromotive force induced in winding 4 by the flux created in core 26 of transformer A due to alternating current in winding 2 neutralizes the alternating electromotive force induced in winding 8 of transformer B by the flux created in core 27 due to the alternating current in winding 6. Furthermore, it will be seen that the potential difference between the terminals of impedance 12 is opposed by the electromotive force applied to the output circuit by the potential drop across impedance 28. The parts are so proportioned that when the current being supplied to the output circuit, has its normal value, usually zero, the potential difference across the terminals of impedance 12 is exactly equalized by the electromotive force supplied to the output circuit by impedance 28, and under these conditions, of course, no current flows through the load L.

Furthermore, the windings 1 and 5 are connected in series in the input circuit in opposition so that the alternating electromotive force induced in winding 1 neutralizes the electromotive force induced in winding 5. When the current in the input circuit is increased, the unidirectional fluxes created in cores 26 and 27 by the currents in windings 1 and 5 respectively, are increased, and the permeability of these cores is decreased, thereby decreasing the reactance of windings 2 and 6. As a result, the current through these windings, and hence the current through impedance 12 increases and the potential difference across impedance 12 is correspondingly increased. When this happens, the balance which normally exists in the output circuit is destroyed and current is supplied to the load L. The arrangement of the windings of the transformers A and B is such that the output current flowing in windings 4 and 8 increases the change in the permeability of the transformer cores caused by the input current in windings 1 and 5. That is to say, the current in winding 4 decreases the permeability of core 26 and the current in winding 8 decreases the permeability of core 27. The reactance of windings 2 and 6 is therefore still further decreased and the current through these windings and through impedance 12 is correspondingly increased. These changes continue until a condition of equilibrium is reached, the current in the output circuit at equilibrium depending upon the magnitude of the input current, all other conditions remaining constant. When the current in the input circuit is restored to its original value, the current in the output circuit also returns to its initial value as will be understood without further explanation.

The sensitivity of the apparatus depends, of course, upon the initial permeability of cores 26 and 27, and for the purpose of adjusting this permeability to its optimum value, I connect winding 3 of transformer A and winding 7 of transformer B in series with a battery 10 and a reactor 9. The current supplied to windings 3 and 7 by battery 10 creates in cores 26 and 27, respectively, unidirectional fluxes, the magnitude of which may be varied to bring the initial permeability of these cores to the desired values. The purpose of reactor 9 is to increase the impedance of the circuit including windings 3 and 7 to transient currents, thereby preventing this circuit from absorbing energy when the current in the input circuit is varied.

Figure 2:
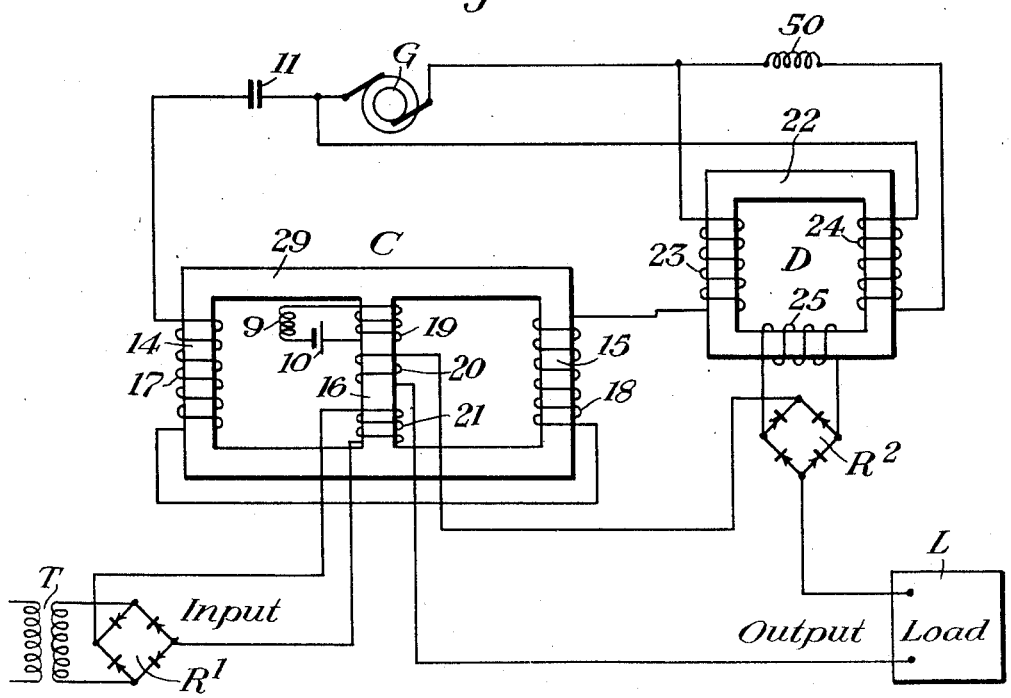

Referring now to Fig. 2, the reference character C designates a transformer comprising a magnetizable core 29 having a bridging member 16 provided with three windings 19, 20 and 21. One leg 14 of this core is provided with a winding 17, and the other leg 15 carries a winding 18. Winding 21 is included in the input circuit and is at times supplied with current from transformer T through rectifier $R^1$.

Associated with the transformer C is a second transformer D comprising a core 22 having three windings 23, 24 and 25. Load L is connected in series with winding 20 in an output circuit which is supplied with current through rectifier $R^2$ from winding 25 of transformer D. The alternator G supplies current to a circuit including windings 17 and 18 of transformer C and winding 23 of transformer D. This circuit may be tuned to resonance by condenser 11. The windings 17 and 18 are so disposed that at any instant the fluxes created by currents in these windings are in opposition in the bridging member 16, and it follows that under normal conditions no electromotive force is induced in the windings 19, 20 or 21.

Winding 24 of transformer D is supplied with alternating current from alternator G through an impedance 50, the parts being so adjusted that under normal conditions the alternating flux created in core 22 by current in winding 23 is exactly neutralized by the alternating flux created in this core by current in winding 24. Under these conditions, then, there is no electromotive force induced in winding 25 and there is no current in the output circuit including the load L. When the current supplied to the input circuit is increased, however, the increased unidirectional current in winding 21 decreases the permeability of the bridging member 16. Since this member is included in the magnetic circuits for the fluxes linking both windings 17 and 18, this change in permeability causes a decrease in the reactances of windings 17 and 18. As a result, the current through these windings, and hence through winding 23 of transformer D, increases, but there is no change in the current through winding 24 of transformer D. As a result, the balance normally existing between the fluxes induced in core 22 of transformer D is destroyed, and the resultant alternating flux in this core induces an electromotive force in winding 25. A unidirectional current is therefore supplied to the load L and winding 20 in series. The disposition of the parts is such that the unidirectional flux caused by the current thus supplied to winding 20 aids the unidirectional flux created in member 16 by current in winding 21. The effect of the current in the output circuit is therefore to still further decrease the permeability of bridging member 16. This change in permeability decreases the reactance of windings 17 and 18 and increases the current in winding 23 of transformer D, thereby increasing the current in the output circuit. This operation continues until a condition of equilibrium has been reached. It will be clear from the foregoing that when the input current returns to its original value, the output current also returns to its original value, the functioning of the apparatus being apparent without tracing the sequence of operations in detail.

Battery 10 supplies current through a reactor 9 to a winding 19 for adjusting the initial permeability of the core of transformer C.

Figure 3:
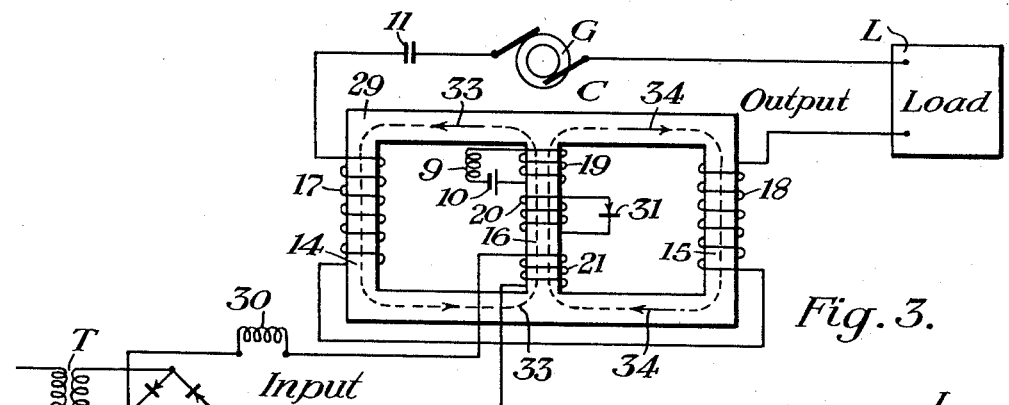

Referring now to Fig. 3, the transformer C is similar to the transformer shown in Fig. 2, but the load L is connected directly in series with generator G, condenser 11, and windings 17 and 18. The alternating fluxes produced in core 29 by the alternating currents thus supplied to windings 17 and 18 traverse member 16 in opposite directions at any instant so that these fluxes do not cause a magnetic potential between the extremities of member 16. Winding 21 on member 16 is at times supplied with direct current as in the preceding figures, the source of such current in the form here shown, being the secondary of transformer T and rectifier $R^1$. Battery 10 supplies a unidirectional current to winding 19 in series with impedance 9 as in Fig. 2. Winding 20, however, has its terminals connected across a rectifier 31 which permits current to flow through this winding in one direction but not in the other.

When the current in winding 21 is increased, the unidirectional flux in member 16 is also increased, and as a result, the permeability of the legs 14 and 15 is correspondingly decreased. It follows that the impedances of windings 17 and 18 are thereby decreased, so that the current supplied by generator G to the load L through windings 17 and 18 is increased. Furthermore, the unidirectional flux created in member 16 has another effect which I will now describe. It will be seen that a portion of the flux created in member 16 by current in winding 21 traverses a path including leg 14 and indicated in the drawing by arrows 33. Another portion of this flux traverses the path indicated by arrows 34 and including leg 15. It will be seen that during one-half cycle of the alternating flux created in core 29 by currents in windings 17 and 18, this alternating flux will aid the unidirectional flux in leg 14 and will oppose the unidirectional flux in leg 15. During the other half cycle, however, the alternating flux will aid the unidirectional flux in leg 15 and will oppose the unidirectional flux in leg 14. Since the reluctances of paths 33 and 34 depend upon the density of the flux through these paths, it follows that these reluctances will be varied by different amounts during at least a portion of each cycle. The balance normally existing between the alternating fluxes created in core 29 by windings 17 and 18 is therefore destroyed so that an alternating flux is created in member 16. This alternating flux of course induces in winding 20 an alternating electromotive force. Due to the rectifier 31, however, current can flow in this winding only during alternate half cycles and the rectifier 31 is so arranged that the current which is permitted to flow in winding 20 creates a unidirectional flux in member 16 which aids the unidirectional flux created in this member by current in winding 21. It follows that impedances of windings 17 and 18 are still further decreased and the unbalance between the alternating flux in core 29 is still further increased with a consequent further increase in the current in load L. This cycle of operation continues until a condition of equilibrium is reached for which the current supplied to the load will have been increased by an amount which depends upon the amount of increase in the current supplied to winding 21. When the current in winding 21 returns to its original value, the current supplied to the load L also returns to its original value, the apparatus operating in a manner which will be understood from the foregoing without further explanation.

It should be pointed out that the alternating flux in member 16 induces an alternating electromotive force in winding 21, and in order to suppress this induced electromotive force an impedance 30 is interposed in the input circuit.

Under some conditions of operation, the winding 20 with its associated rectifier 31 may be dispensed with, the function of these parts being performed by the input circuit including winding 21 and rectifier $R^1$. It will be noticed that alternating current induced in winding 21 by the alternating flux in member 16 resulting from an unbalance of the alternating fluxes in core 29 due to direct current supplied to winding 21, can flow through the circuit including rectifier $R^1$ in only one direction, and that this direction is such that the induced current thus created in winding 21 assists the unidirectional current supplied to the winding from transformer T. Under proper conditions, therefore, the apparatus will operate regeneratively without the addition of winding 20 and rectifier 31.

Figure 4:
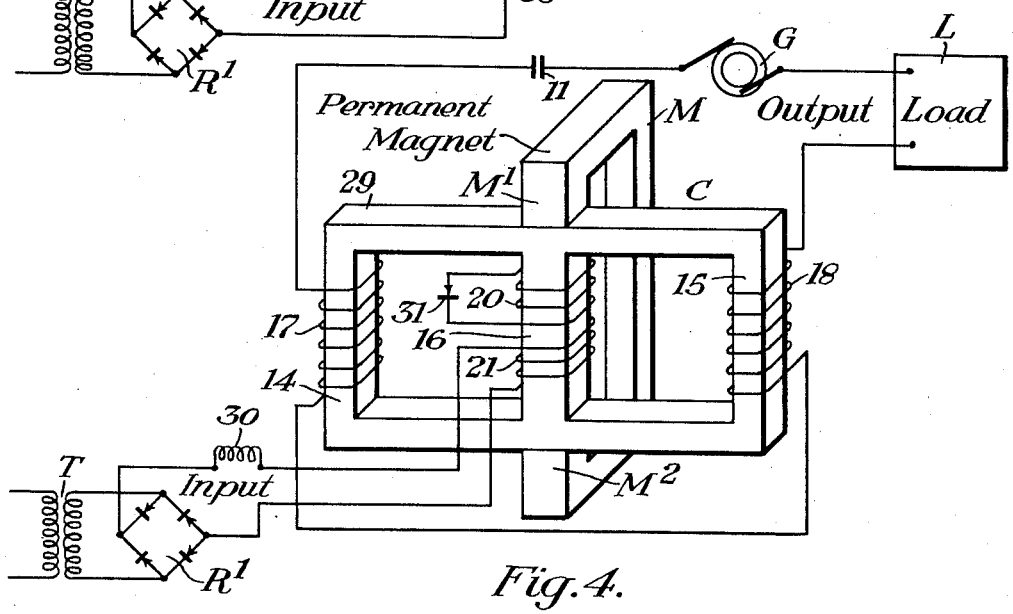

In the form shown in Fig. 4, the parts are similar to the modification illustrated in Fig. 3, with the single exception that a permanent magnet M having its poles $M^1$ and $M^2$ adjacent the extremities of member 16, supplies unidirectional flux to the core 29 to adjust the initial permeability of the core to its optimum value. With this arrangement the winding 19 and its associated battery 10 and impedance 9, shown in Figs. 1, 2 and 3, are, of course, unnecessary. One advantage of the permanent magnet is that the magnitude of the flux created in the core 29 by this magnet is substantially permanent and is not subject to variations due to changes in the electromotive force of the battery 10. The operation of the apparatus illustrated in Fig. 4 is similar to the operation of the apparatus shown in Fig. 3, it being understood that the core 29 and magnet M are proportioned in such manner that the flux supplied by the permanent magnet M is properly distributed between the legs 14 and 15 and member 16 to obtain the most desirable operation of the apparatus.

Figure 5:
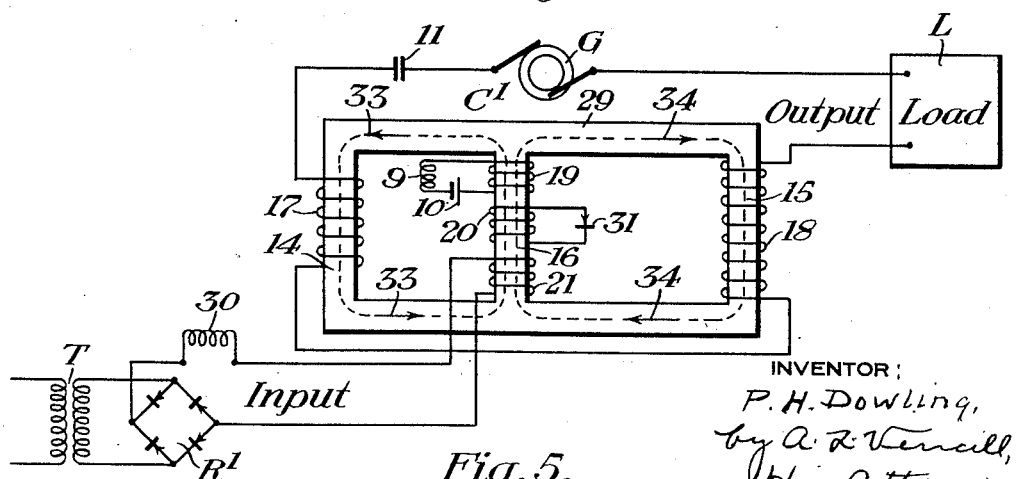

Referring now to Fig. 5, the transformer $C^1$ is similar to the transformer C shown in Fig. 3 except that the core 29 is non-symmetrical, member 16 being located closer to leg 14 than to leg 15. It follows, therefore, that the flux path 33 including member 16 and leg 14 has a lower reluctance than path 34 including member 16 and leg 15. The windings 17 and 18 are so proportioned that under normal conditions the magnetomotive forces supplied by these windings are proportional to the reluctances of their respective paths so that no alternating flux is produced in member 16. When the current in the input circuit is increased, the increased unidirectional flux in member 16 decreases the impedances of windings 17 and 18 and produces an increase in the alternating current supplied to the load L by generator G. The flux thus supplied to member 16 divides unequally between legs 14 and 15 and it follows that the reluctances of paths 33 and 34 are varied in different degrees. As a result, the balance normally existing between the alternating fluxes created in core 29 by windings 17 and 18 is destroyed and an alternating flux is created in member 16. This alternating flux in member 16 induces in winding 20 an alternating electromotive force and during alternate half cycles, current flows in winding 20 through rectifier 31 to produce in member 16 a unidirectional flux which assists the unidirectional flux created in this member by current in winding 21. The cycle of operations continues, as in Fig. 3, until a condition of equilibrium is reached at which the output current in load L has a higher value than that corresponding to the initial value of the current in winding 21. When the input current in winding 21 is restored to its initial value the current in load L is also restored to its initial value, the operation being obvious from the foregoing description.

It should be pointed out that with apparatus embodying my invention the current in the output circuit is varied in accordance with the current supplied to the input circuit, and that the apparatus operates regeneratively in response to comparatively small changes in the input circuit to cause enormously larger changes in the output current. Furthermore, this operation is accomplished without the use of moving parts. Apparatus embodying my invention is particularly suitable for, though in no way limited to, use in railway traffic controlling apparatus in which the train is supplied with a device such as a relay which is supplied with current in accordance with variations in the current flowing in a track rail. In my present invention the train carried relay could be substituted for the load L and the track rail would correspond to the primary of transformer T. The relay would then be energized in accordance with the trackway current.

It should be distinctively understood, however, that my invention is not limited to use with input circuits supplied by an alternating current source. When the input energy is direct current, this current may be supplied directly to the control winding (windings 1 and 5 in Fig. 1 and winding 21 in the remaining figures), the rectifier R¹ and transformer T then being unnecessary.

Although I have herein shown and described only a few forms of electrical translating apparatus embodying my invention, it is understood that various changes and modifications may be made therein within the scope of the appended claims without departing from the spirit and scope of my invention.

Having thus described my invention, what I claim is:

1. Electrical translating apparatus comprising a winding, a first circuit including said winding and a source of current, means for at times varying the impedance of said winding, an output circuit, means for varying the current in said output circuit in accordance with variations in the current in said first circuit, and means responsive to variations in the current in said output circuit for varying the impedance of said winding.

2. Electrical translating apparatus comprising a winding, a first circuit for said winding including a source of current, means for at times varying the impedance of said winding, an output circuit including a source of constant electromotive force, means for applying to said output circuit an electromotive force in opposition to the electromotive force from said source and having a magnitude which depends upon the current in said first circuit, and means responsive to variations in the current in said output circuit for varying the impedance of said winding.

3. In combination, a magnetizable core, two windings on said core, a first circuit including one winding and a source of current, a second circuit including the second winding and a source of current, means for varying the reluctance of said core, and means for varying the current in said second circuit in accordance with variations in the current in the first circuit.

4. In combination, a magnetizable core, two windings on said core, a first circuit including one winding and a source of current, a second circuit including the second winding and a source of current, means for at times creating a unidirectional flux in said core, and means responsive to a variation in the current in the first circuit for imposing an electromotive force upon said second circuit.

5. In combination, a transformer comprising three windings, a first circuit including one of said windings and a source of alternating electromotive force, an output circuit including a second winding and a source of direct current, means for at times supplying direct current to the remaining winding, and means for varying the current in said output circuit in accordance with variations in the current in said first circuit.

6. In combination, a transformer comprising a magnetizable core having three windings, means for at times supplying one of said windings with unidirectional current, a source of alternating current, a rectifier, an impedance connected with a second winding and said source through said rectifier, an output circuit including said impedance and the remaining winding, and means for impressing upon said output circuit a unidirectional electromotive force which opposes the potential difference across said impedance.

7. In combination, a transformer comprising a magnetizable core having three windings, means for at times supplying one of said windings with unidirectional current, a source of alternating current, a rectifier, an impedance connected with a second winding and said source through said rectifier, an output circuit including said impedance and the remaining winding, and means for impressing upon said output circuit a unidirectional electromotive force which equalizes the potential difference across said impedance when no current is being supplied to said first winding.

8. In combination, a magnetizable core, a winding on said core, a circuit including said winding and a source of current, means for at times varying the flux in said core to vary the impedance of said winding, means responsive to such variation in the impedance of said winding to cause further additive variation in the flux in said core, and a load receiving energy from said circuit.

9. In combination, a magnetizable core, a winding on said core, a circuit including said winding and a source of alternating current, means for at times creating a unidirectional flux in said core to decrease the impedance of said winding, means responsive to a decrease in the impedance of said winding to increase said unidirectional flux, and a load receiving energy from said circuit.

10. In combination, a first transformer having a magnetizable core carrying a first, a second, and a third winding; a second transformer having a magnetizable core carrying a fourth, a fifth and a sixth winding; a first circuit for supplying alternating current to said first and fourth windings in series, an input circuit at times supplied with direct current and including said second and fifth windings in series opposition, and an output circuit including said third and sixth windings in series opposition and receiving energy from said first circuit, the impedance of said first and fourth windings depending upon the current in both said input and output circuits.

In testimony whereof I affix my signature.

PHILIP H. DOWLING.